United States Patent
Lee

(10) Patent No.: US 11,490,319 B2
(45) Date of Patent: Nov. 1, 2022

(54) METHOD AND APPARATUS FOR SIGNALING OF ACCESS BARRING PARAMETERS IN WIRELESS COMMUNICATION SYSTEM

(71) Applicant: LG ELECTRONICS INC., Seoul (KR)

(72) Inventor: Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/963,485

(22) PCT Filed: Apr. 4, 2019

(86) PCT No.: PCT/KR2019/003993
§ 371 (c)(1),
(2) Date: Jul. 20, 2020

(87) PCT Pub. No.: WO2019/194597
PCT Pub. Date: Oct. 10, 2019

(65) Prior Publication Data
US 2021/0360508 A1 Nov. 18, 2021

(30) Foreign Application Priority Data
Apr. 5, 2018 (KR) .......................... 10-2018-0039882

(51) Int. Cl.
*H04W 48/02* (2009.01)
*H04W 84/04* (2009.01)

(52) U.S. Cl.
CPC .......... *H04W 48/02* (2013.01); *H04W 84/042* (2013.01)

(58) Field of Classification Search
CPC ..................................................... H04W 48/02
USPC ........................................................ 455/434
See application file for complete search history.

(56) References Cited

U.S. PATENT DOCUMENTS

| 2016/0014672 A1 | 1/2016 | Jang et al. |
| 2016/0044727 A1 | 2/2016 | Zisimopoulos et al. |
| 2016/0302135 A1* | 10/2016 | Yang ..................... H04L 5/0094 |

FOREIGN PATENT DOCUMENTS

| EP | 2806692 | 11/2014 |
| WO | 2013/051840 | 4/2013 |
| WO | 2015/181254 | 12/2015 |

OTHER PUBLICATIONS

PCT International Application No. PCT/KR2019/003993, International Search Report dated Jul. 30, 2019, 2 pages.

* cited by examiner

*Primary Examiner* — Joel Ajayi
(74) *Attorney, Agent, or Firm* — Lee Hong Degerman Kang Waimey

(57) ABSTRACT

A method and apparatus for performing access control in a wireless communication system is provided. A user equipment (UE) receives a configuration of one or more access categories from a network, and acquires a first system information block (SIB) including barring information for a first set of access categories from the network. When the network does not indicate existence or scheduling of a second SIB, the UE allows an access attempt of an access category belonging to a second set of access categories, and starts an uplink (UL) transmission for the access category to the network.

17 Claims, 5 Drawing Sheets

[Fig. 1]

[Fig. 3]
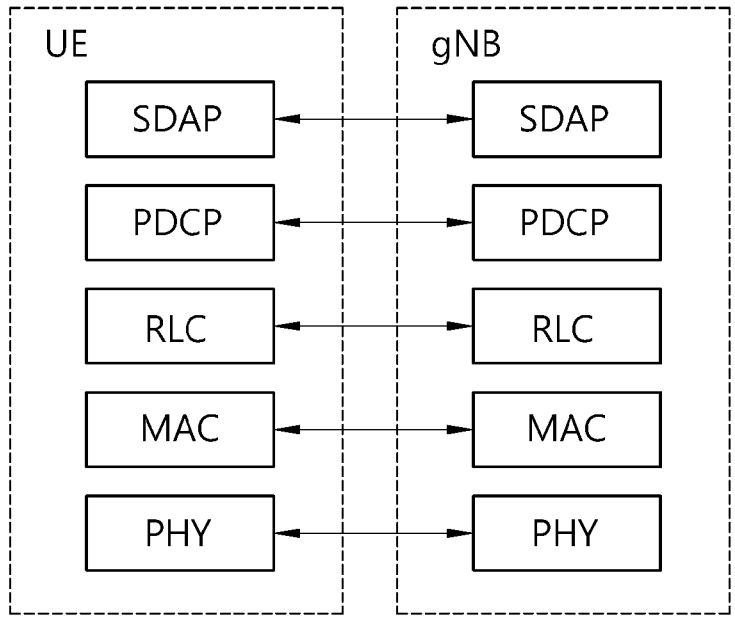
[Fig. 4]
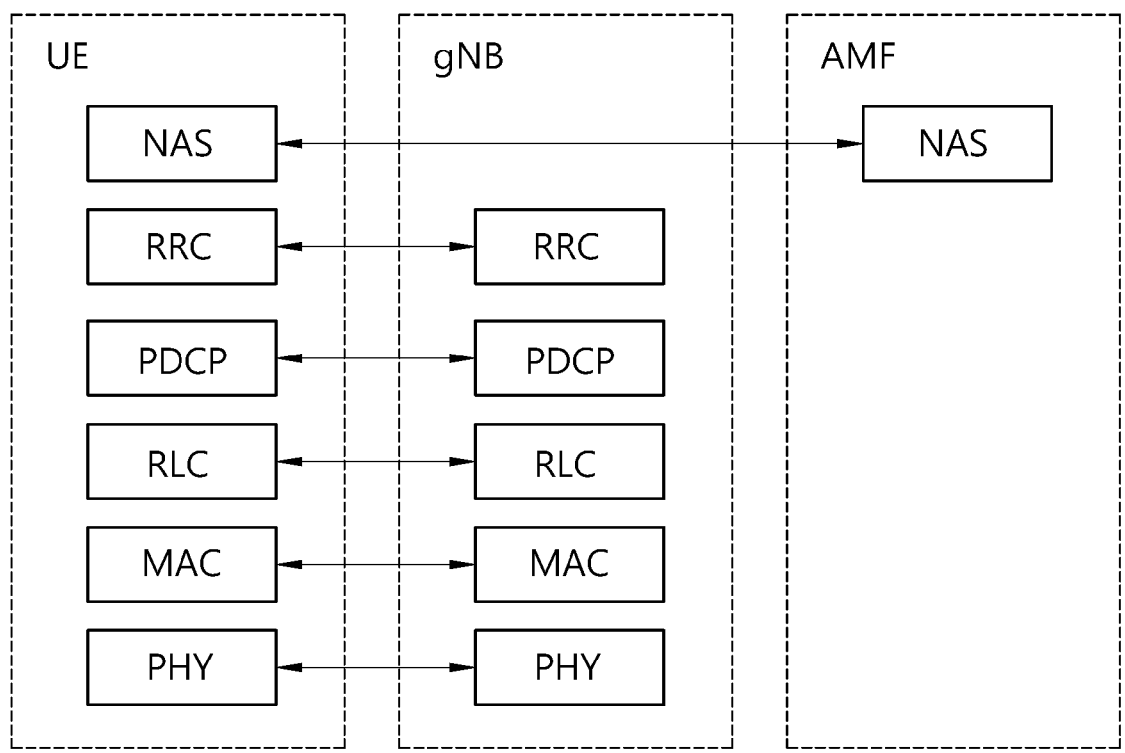

[Fig. 5]
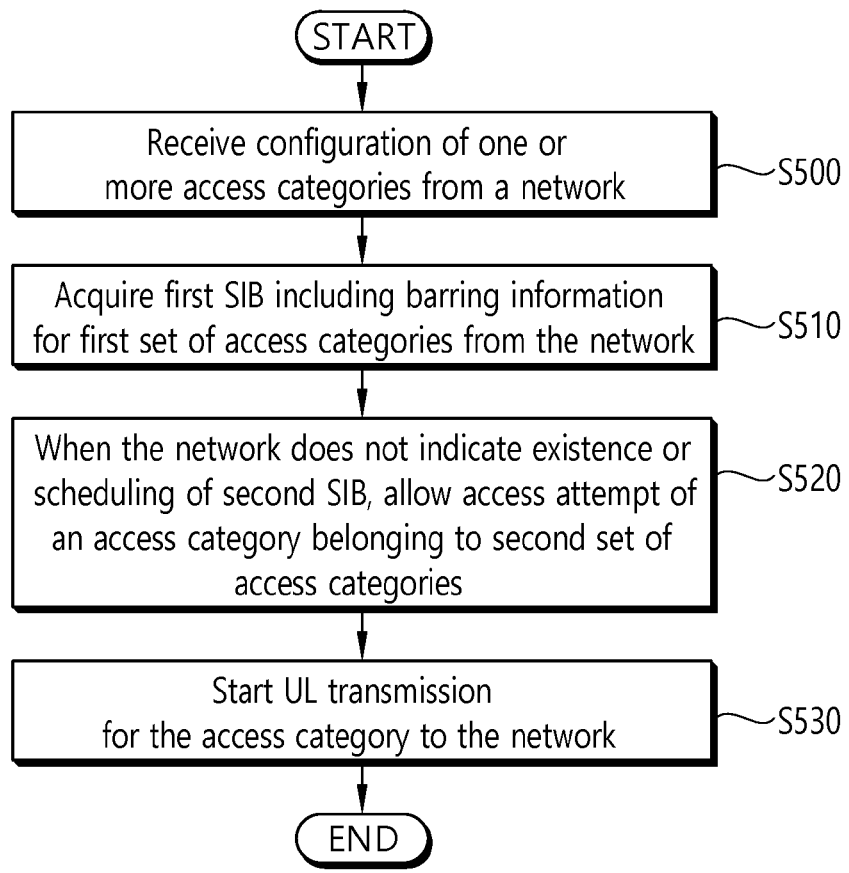
[Fig. 6]
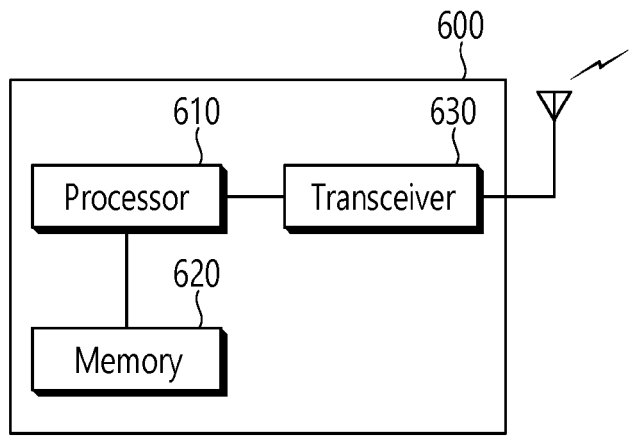

[Fig. 7]
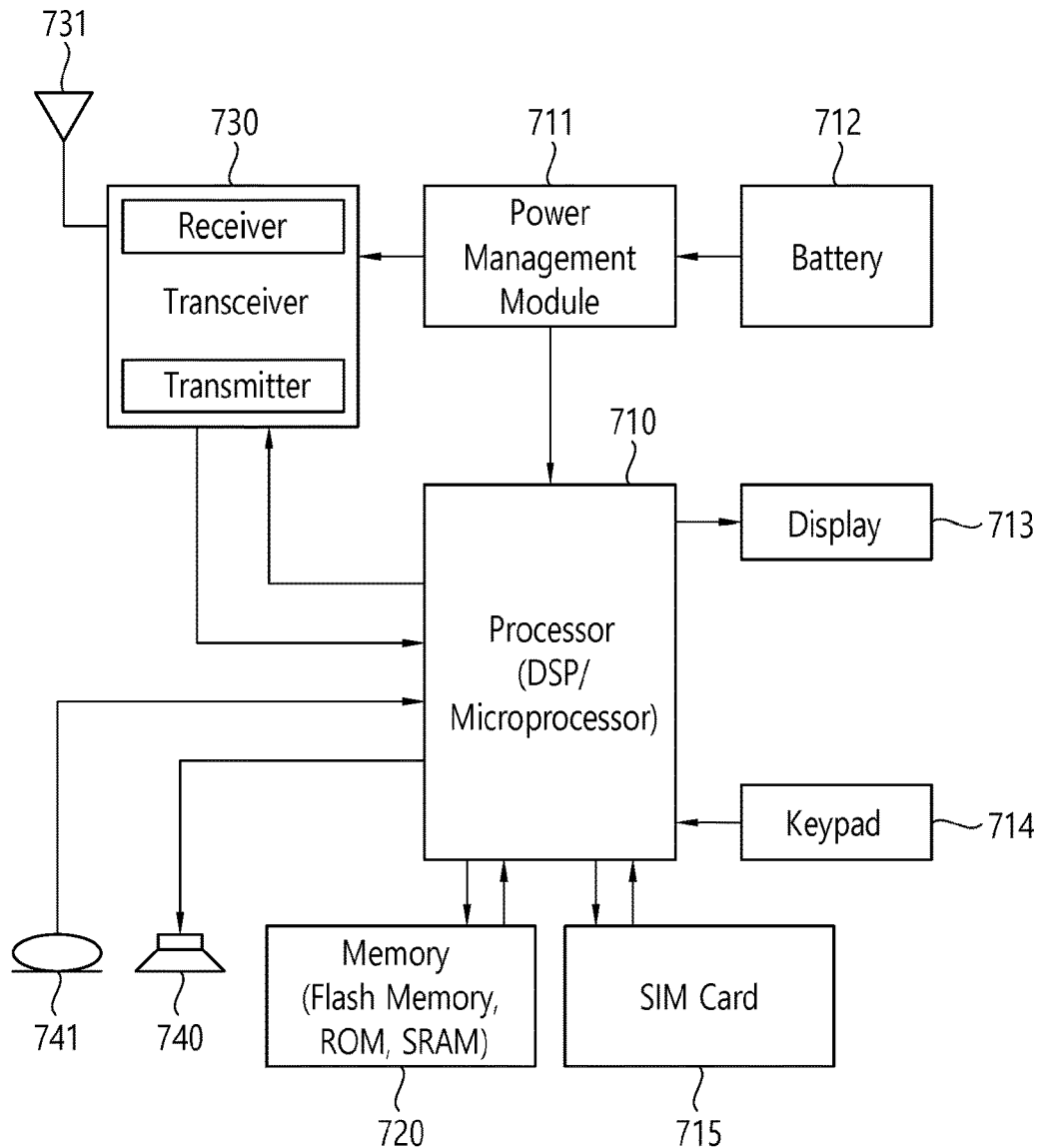
[Fig. 8]
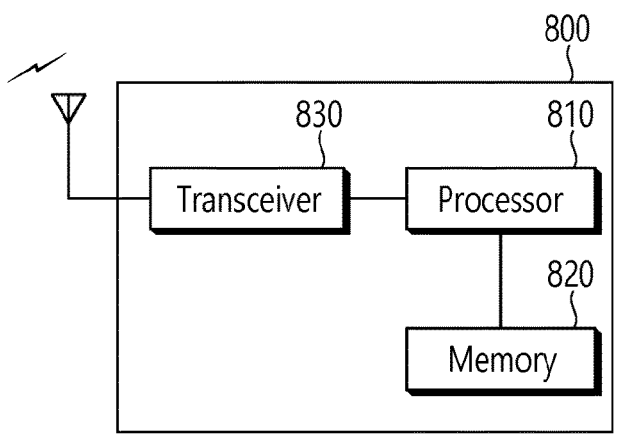

METHOD AND APPARATUS FOR SIGNALING OF ACCESS BARRING PARAMETERS IN WIRELESS COMMUNICATION SYSTEM

CROSS-REFERENCE TO RELATED APPLICATIONS

This application is the National Stage filing under 35 U.S.C. 371 of International Application No. PCT/KR2019/003993, filed on Apr. 4, 2019, which claims the benefit of earlier filing date and right of priority to Korean Application No. 10-2018-0039882, filed on Apr. 5, 2018, the contents of which are all hereby incorporated by reference herein in their entirety.

TECHNICAL FIELD

The present invention relates to wireless communications, and more particularly, to a method and apparatus for signaling of access barring parameters in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

Depending on operator policies, deployment scenarios, subscriber profiles, and available services, different criterion will be used in determining which access attempt should be allowed or blocked when congestion occurs in the 5G system. These different criteria for access control are associated with access identities and access categories. The 5G system will provide a single unified access control where operators control accesses based on these two aspects.

Size of access barring parameters is expected to be big since there are multiple access categories. An efficient method for signaling access barring parameters should be required.

In an aspect, a method performed by a user equipment (UE) in a wireless communication system is provided. The method includes receiving a configuration of one or more access categories from a network, acquiring a first system information block (SIB) including barring information for a first set of access categories from the network, when the network does not indicate existence or scheduling of a second SIB, allowing an access attempt of an access category belonging to a second set of access categories, and starting an uplink (UL) transmission for the access category to the network.

In another aspect, a user equipment (UE) in a wireless communication system is provided. The UE includes a memory, a transceiver, and a processor, operably coupled to the memory and the transceiver, and configured to control the transceiver to receive a configuration of one or more access categories from a network, control the transceiver to acquire a first system information block (SIB) including barring information for a first set of access categories from the network, when the network does not indicate existence or scheduling of a second SIB, allow an access attempt of an access category belonging to a second set of access categories, and control the transceiver to start an uplink (UL) transmission for the access category to the network.

In another aspect, a processor for a wireless communication device in a wireless communication system is provided. The processor is configured to control the wireless communication device to receive a configuration of one or more access categories from a network, control the wireless communication device to acquire a first system information block (SIB) including barring information for a first set of access categories from the network, when the network does not indicate existence or scheduling of a second SIB, allow an access attempt of an access category belonging to a second set of access categories, and control the wireless communication device to start an uplink (UL) transmission for the access category to the network.

Access barring parameters can be signaled efficiently.

BRIEF DESCRIPTION OF THE DRAWINGS

FIG. 3 shows a block diagram of a user plane protocol stack to which technical features of the present invention can be applied.

FIG. 4 shows a block diagram of a control plane protocol stack to which technical features of the present invention can be applied.

FIG. 5 shows an example of a method for performing an access control performed by a UE according to an embodiment of the present invention.

FIG. 6 shows a UE to implement an embodiment of the present invention.

FIG. 7 shows more detailed UE to implement an embodiment of the present invention.

FIG. 8 shows a network node to implement an embodiment of the present invention.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
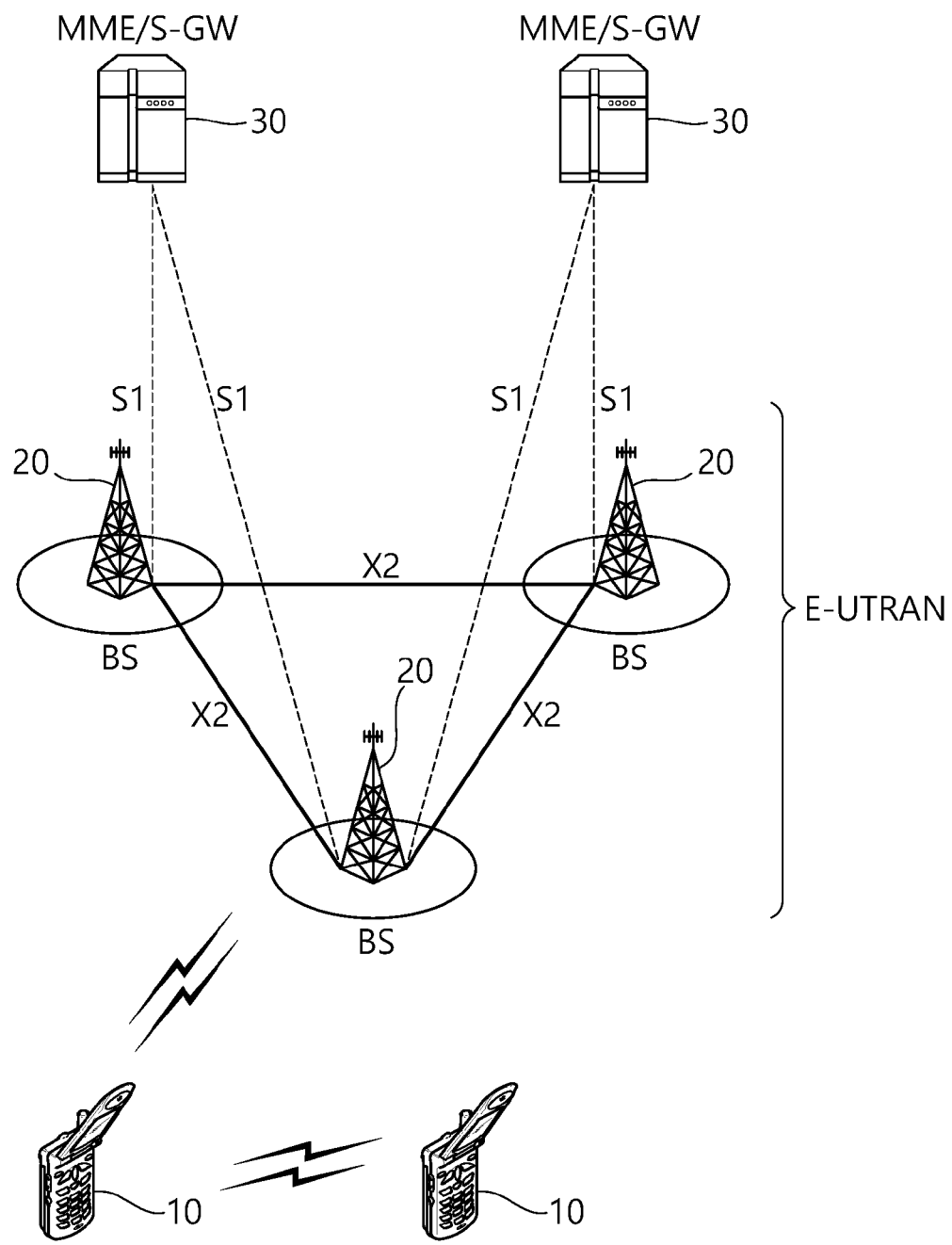
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
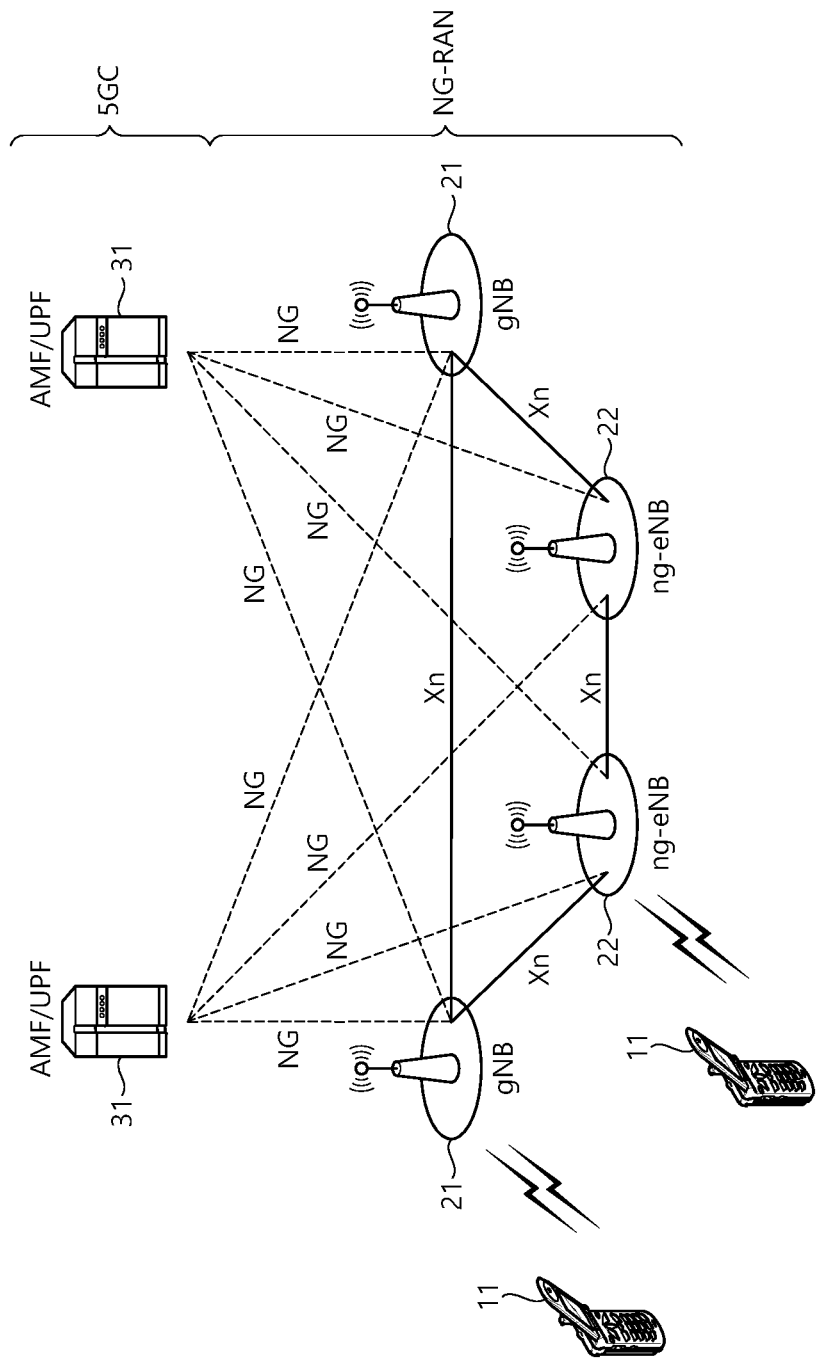
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG.

4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Unified access control is described. In unified access control, each access attempt is categorized into one or more of the access identities and one of the access categories. Based on the access control information applicable for the corresponding access identity and access category of the access attempt, the UE performs a test whether the actual access attempt can be made or not.

The unified access control supports extensibility to allow inclusion of additional standardized access identities and access categories and supports flexibility to allow operators to define operator-defined access identities and access categories using their own criterion (for access identities, subscription, for access categories, e.g. network slicing, application, and application server).

Additionally, the use of legacy access classes 11-15 is expanded upon to potentially allow an access attempt to succeed that otherwise might have been barred based on the type of user.

Based on operator's policy, the 5G system shall be able to prevent UEs from accessing the network using relevant barring parameters that vary depending on access identity and access category. Access identities are configured at the UE as listed in Table 1.

TABLE 1

| Access identity number | UE configuration |
| --- | --- |
| 0 | UE is not configured with any parameters from this table |
| 1 | UE is configured for Multimedia Priority Service (MPS). |
| 2 | UE is configured for Mission Critical Service (MCS). |
| 3-10 | Reserved for future use |
| 11 | Access Class 11 is configured in the UE. |
| 12 | Access Class 12 is configured in the UE. |
| 13 | Access Class 13 is configured in the UE. |
| 14 | Access Class 14 is configured in the UE. |
| 15 | Access Class 15 is configured in the UE. |

Access identity 1 is used to provide overrides according to the subscription information in UEs configured for MPS. The subscription information defines whether an override applies to UEs within one of the following categories:

a) UEs that are configured for MPS;

b) UEs that are configured for MPS and are in the PLMN listed as most preferred PLMN of the country where the UE is roaming in the operator-defined PLMN selector list or in their home PLMN (HPLMN) or in a PLMN that is equivalent to their HPLMN;

c) UEs that are configured for MPS and are in their HPLMN or in a PLMN that is equivalent to it.

Access identity 2 is used to provide overrides according to the subscription information in UEs configured for MCS. The subscription information defines whether an override applies to UEs within one of the following categories:

a) UEs that are configured for MCS;

b) UEs that are configured for MCS and are in the PLMN listed as most preferred PLMN of the country where the UE is roaming in the operator-defined PLMN selector list or in their HPLMN or in a PLMN that is equivalent to their HPLMN;

c) UEs that are configured for MCS and are in their HPLMN or in a PLMN that is equivalent to it.

Access identities 11 and 15 are valid in HPLMN only if the equivalent HPLMN (EHPLMN) list is not present or in any EHPLMN. Access identities 12, 13 and 14 are valid in HPLMN and visited PLMNs of home country only. For this purpose the home country is defined as the country of the mobile country code (MCC) part of the international mobile subscriber identity (IMSI).

Access categories are defined by the combination of conditions related to UE and the type of access attempt as listed in Table 2.

TABLE 2

| Access Category number | Conditions related to UE | Type of access attempt |
|---|---|---|
| 0 | All | Mobile originating (MO) signaling resulting from paging |
| 1 | UE is configured for delay tolerant service and subject to access control for access category 1, which is judged based on relation of UE's HPLMN and the selected PLMN. | All except for emergency |
| 2 | All | Emergency |
| 3 | All except for the conditions in Access Category 1. | MO signaling resulting from other than paging |
| 4 | All except for the conditions in Access Category 1. | Multimedia telephony service (MMTEL) voice |
| 5 | All except for the conditions in Access Category 1. | MMTEL video |
| 6 | All except for the conditions in Access Category 1. | Short message service (SMS) |
| 7 | All except for the conditions in Access Category 1. | MO data that do not belong to any other access categories |
| 8-31 | | Reserved standardized access categories |
| 32-63 | All | Based on operator classification |

The barring parameter for access category 1 is accompanied with information that define whether access category applies to UEs within one of the following categories:

a) UEs that are configured for delay tolerant service;

b) UEs that are configured for delay tolerant service and are neither in their HPLMN nor in a PLMN that is equivalent to it;

c) UEs that are configured for delay tolerant service and are neither in the PLMN listed as most preferred PLMN of the country where the UE is roaming in the operator-defined PLMN selector list on the subscriber identification module (SIM)/universal SIM (USIM), nor in their HPLMN nor in a PLMN that is equivalent to their HPLMN.

When there are an access category based on operator classification and a standardized access category to both of which an access attempt can be categorized, and the standardized access category is neither 0 nor 2, the UE applies the access category based on operator classification. When there are an access category based on operator classification and a standardized access category to both of which an access attempt can be categorized, and the standardized access category is 0 or 2, the UE applies the standardized access category.

One or more access identities and only one Access Category are selected and tested for an access attempt.

The 5G network shall be able to broadcast barring control information (i.e. a list of barring parameters associated with an access identity and an access category) in one or more areas of the RAN.

The UE shall be able to determine whether or not a particular new access attempt is allowed based on barring parameters that the UE receives from the broadcast barring control information and the configuration in the UE.

In the case of multiple core networks sharing the same RAN, the RAN shall be able to apply access control for the different core networks individually.

The unified access control framework shall be applicable both to UEs accessing the 5G CN using E-UTRA and to UEs accessing the 5G CN using NR.

The unified access control framework shall be applicable to UEs in RRC_IDLE, RRC_INACTIVE, and RRC_CONNECTED at the time of initiating a new access attempt (e.g. new session request). The new session request in RRC_CONNECTED refers to events, e.g. new MMTEL voice or video session, sending of SMS (SMS over IP, or SMS over NAS), new PDU session establishment, existing PDU session modification, and service request to re-establish the user plane for an existing PDU session.

The 5G system shall support means by which the operator can define operator-defined access categories to be mutually exclusive. Examples of criterion of operator-defined access categories are network slicing, application, and application server.

The unified access control framework shall be applicable to inbound roamers to a PLMN.

The serving PLMN should be able to provide the definition of operator-defined access categories to the UE.

Any number of these access identities may be barred at any one time.

Access category 0 shall not be barred, irrespective of access identities. The network can control the amount of access attempts relating to access category 0 by controlling whether to send paging or not.

According to the general requirements for unified access control described above, the UE operation is as follows. The purpose of the unified access control procedure is to perform access barring check upon request from upper layers or the RRC layer. Upon initiation of the procedure, the UE shall:

1> if SIBX includes uac-BarringPerPLMN-List and the uac-BarringPerPLMN-List contains an UAC-BarringPerPLMN entry with the plmn-IdentityIndex corresponding to the PLMN selected by upper layers:

2> select the UAC-BarringPerPLNMN entry with the plmn-IdentityIndex corresponding to the PLMN selected by upper layers;

2> in the remainder of this procedure, use the selected UAC-BarringPerPLMN entry (i.e. presence or absence of access barring parameters in this entry) irrespective of the common access barring parameters included in SIBX;

[1> else:

2> in the remainder of this procedure use the common access barring parameters (i.e. presence or absence of these parameters) included in SIBX;]

1> if [an access category is indicated by upper layers) or selected by the RRC layer, and if] the access category does not correspond to '0':

2> if the BarringPerCatList contains a BarringPerCat entry corresponding to the access category:

3> select the BarringPerCat entry corresponding to the access category;

2> perform access barring check for the access category, using [T30x] as "Tbarring" and uac-BarringInfo in the BarringPerCat as "UAC barring parameter";

2> if the access attempt is considered as barred and the access category is indicated by upper layers:

3> inform upper layers that access barring for the access category is applicable, upon which the procedure ends;

The UE shall:

1> if timer [T30x] corresponding to an access category expires or is stopped and the access category was indicated by upper layers:

2> inform upper layers about barring alleviation for the access category;

The UE shall:

1> if SIBXincludes "UAC barring parameter" for the access category:

2> if one or more Access Identities are indicated by upper layers or obtained by the RRC layer, and 2> if for at least one of these access identities the corresponding bit in the ac-BarringForAccessIdentity contained in "UAC barring parameter" is set to zero:
  3> consider the access attempt as allowed;
  2> else:
  3> draw a random number 'rand' uniformly distributed in the range: 0=rand<1;
  3> if 'rand' is lower than the value indicated by uac-BarringFactor included in "UAC barring parameter":
    4> consider the access attempt as allowed;
  3> else:
    4> consider the access attempt as barred;
  1> else:
    2> consider the access attempt as allowed;
1> if the access attempt is considered as barred [and "Tbarring" is not running for the access category]:
  2> draw a random number 'rand' that is uniformly distributed in the range 0=rand<1;
  2> start timer "Tbarring" with the timer value calculated as follows, using the uac-BarringTime included in "AC barring parameter":
    "Tbarring"=(0.7+0.6*rand)*uac-BarringTime;

Table 3 shows an example of SIBX including UAC barring parameter.

can be signalled in SIBX. It has not been yet discussed whether SIB should broadcast all barring parameters for all access categories. It has not been yet discussed what if SIB does not include an access barring parameter for the selected access category.

In order to reduce signaling overhead caused by the barring parameters in congestion, various embodiments can be described as follows according to the present invention.

FIG. 5 shows an example of a method for performing an access control performed by a UE according to an embodiment of the present invention.

In step S500, the UE receives a configuration of one or more access categories from a network (e.g. eNB/gNB/ng-eNB/en-gNB/external server). In step S510, the UE acquires a first SIB including barring information for a first set of access categories from the network. The first SIB may indicate which access category belongs to the first set of access categories. Alternatively, the first SIB may indicate which access category belongs to the second set of access categories.

In step S520, when the network does not indicate existence or scheduling of a second SIB, the UE allows an access attempt of an access category belonging to a second set of access categories. In step S530, the UE starts UL transmission for the access category to the network. The second SIB

TABLE 3

```
SIBX ::=                    SEQUENCE {
uac-BarringForCommon        UAC-BarringForCommon
-- FFS: Need for parameters common to PLMNs
uac-BarringPerPLMN-List     UAC-BarringPerPLMN-List
UAC-BarringForCommon ::= SEQUENCE {
    barringPerCatList       BarringPerCatList
}
UAC-BarringPerPLMN-List ::= SEQUENCE (SIZE (1.. maxPLMN)) OF UAC-
BarringPerPLMN
-- maxPLMN = 12
UAC-BarringPerPLMN ::= SEQUENCE {
    plmn-IdentityIndex      INTEGER (1..maxPLMN),
    barringPerCatList       BarringPerCatList
}
BarringPerCatList ::= SEQUENCE (SIZE (1..maxAccessCat-1)) OF BarringPerCat
-- maxAccessCat = 64
BarringPerCat ::= SEQUENCE {
    AccessCategory          INTEGER (1..maxAccessCat),
    uac-BarringInfo         SEQUENCE {
    uac-BarringFactor       ENUMERATED {
    p00, p05, p10, p15, p20, p25, p30, p40,
    p50, p60, p70, p75, p80, p85, p90, p95},
    -- FFS: parameter values
    uac-BarringTime         ENUMERATED {s4, s8, s16, s32, s64, s128, s256, s512}
    -- FFS: parameter values
    uac-BarringForAccessIdentityList    BIT STRING (SIZE(7))
    -- maxAccessIdentity = 7
    -- Corresponds to access identities 1,2, 11-15 (MPS, MCS and AC11-15)
    -- Value 0 indicates that access attempt is allowed for the corresponding access
identity
    }
}
```

SIBX described above in Table 3 may be a system information block type-1 (SIB1). According to Table 3, 20 bits of information element (IE) BarringPerCat for each category may be needed. As this IE can be provided for up to 63 categories and up to 12 PLMNs, the total overhead for access barring parameters would be 15120 bits except PLMN IDs and PLMN common parameters. Thus, it may be difficult to broadcast necessary access barring parameters in SIB1 when the network is congested.

Furthermore, it has not been yet discussed whether common access barring parameters, i.e. common to all PLMNs, may include barring information for the second set of access categories.

When the network indicates existence or scheduling of the second SIB, the UE may acquire the second SIB from the network. The UE may perform access barring check for the access attempt of the access category belong to the second set of access categories based on the second SIB.

The barring information included in the first SIB may be common to all PLMNs. Or, the barring information included in the first SIB may be a specific to a particular PLMN.

The UE may further receive an indicator indicating enabling, updating or disabling of the first SIB. The first SIB may indicate enabling, updating or disabling of the second SIB.

The UE may further receive an indicator indicating enabling, updating or disabling of access control for the first set of access categories. The UE may request delivery of a SIB carrying barring information of the access category based on the indicator.

According to embodiment of the present invention shown in FIG. 5, access barring parameters for multiple access categories and/or multiple PLMNs can be signaled efficiently.

1. Invention 1: Separate SIBs for Barring Parameters

As a first embodiment of the invention 1, the method for the UE performing access to the network may be as follows.

(1) Step 1: When the UE is configured with one or more access categories, the UE acquires the first SIB. The first SIB includes barring information for the first set of zero, one or more access categories at a cell.

The first SIB may indicate which access category belongs to the first set of access categories at a cell. For example, the first SIB may indicate the highest number of the access category in the first set of access categories or may indicate bitmap.

Alternatively, the first SIB may indicate which access category belongs to the second set of access categories at a cell. For example, the first SIB may indicate the lowest number of the access category in the first set of access categories.

Alternatively, the first SIB may include barring parameters only for the first set of access categories, and the second SIB may include barring parameters only for the second set of access categories at a cell. The first set of access categories may be indicated as bitmap in the barring parameters in the first SIB. The second set of access categories may be indicated with a number of the access category in the barring parameters in the second SIB.

The first SIB may be a master information block (MIB), and the second SIB may be SIB1. Or, the first SIB may be SIB1, and the second SIB may be SIB2 or SIBx (x>2). The first SIB may be replaced by PDCCH. In this case, the second SIB may be SIB1.

(2) Step 2: If the first set of access categories dose not fully accommodate the configured access categories, and if the network indicates existence or scheduling of the second SIB, the UE acquires the second SIB and then performs access barring check for an access attempt of one access category belonging to the second set of access categories based on the second SIB. The network may indicate existence or scheduling of the second SIB via MIB, SIB1, paging or PDCCH. The network may indicate existence or scheduling of the second SIB via the first SIB.

Alternatively, if the first set of access categories dose not fully accommodate the configured access categories, and if the network does not indicate existence or scheduling of the second SIB, the UE considers an access attempt of one access category belonging to the second set of access categories as allowed, and then starts UL transmission for the access category.

As a second embodiment of the invention 1, the method for the UE performing access to the network may be as follows.

(1) Step 1: It is assumed that the UE has been registered in the PLMN or the NAS layer of the UE selected the PLMN. When UE is configured with one or more access categories, the UE acquires the first SIB. The first SIB includes barring information common to all PLMNs sharing the cell and/or barring information specific to a particular PLMN for zero, one or more access categories at a cell.

The first SIB may indicate which PLMN(s) barring information is provided in the first SIB for, i.e. the first set of PLMN(s) sharing the cell.

Alternatively, the first SIB may indicate which PLMN(s) barring information is provided in the second SIB for, i.e. the second set of PLMN(s) sharing the cell.

Alternatively, the first SIB may include barring parameters only for the first set of PLMNs, and the second SIB may include barring parameters only for the second set of PLMNs at a cell. The first set of PLMNs may be indicated as bitmap in the barring parameters in the first SIB. The second set of PLMNs may be indicated with a number of the access category in the barring parameters in the second SIB.

The first SIB may be MIB, and the second SIB may be SIB1. Or, the first SIB may be SIB1, and the second SIB may be SIB2 or SIBx (x>2). The first SIB may be replaced by PDCCH. In this case, the second SIB may be SIB1.

(2) Step 2: If barring information specific to the PLMN is provided in the second SIB or if barring information specific to the PLMN or barring information common to all PLMNs is not provided in the first SIB, and if the network indicates existence or scheduling of the second SIB, the UE acquires the second SIB and then performs access barring check for an access attempt of an access category of the PLMN belonging to the second set of PLMNs based on the second SIB. The network may indicate existence or scheduling of the second SIB via MIB, SIB1, paging or PDCCH. The network may indicate existence or scheduling of the second SIB via the first SIB.

Alternatively, if barring information specific to the PLMN is provided in the second SIB or if barring information specific to the PLMN or barring information common to all PLMNs is not provided in the first SIB, and if the network does not indicate existence or scheduling of the second SIB, the UE considers an access attempt of an access category of the PLMN belonging to the second set of PLMNs as allowed and then starts UL transmission for the access category.

The first SIB may indicate barring parameters for one set of zero, one or more access categories, and the second SIB may indicate barring parameters for another set of zero, one or more access categories.

According to the first/second embodiments of the invention 1, the followings options may be considered for the first SIB.

(1) Option 1: The first SIB may indicate existence or scheduling of the second SIB.

If the UE receives the first SIB indicating existence or scheduling of the second SIB, the UE may receive the second SIB immediately in the current BCCH modification period and/or from the beginning of the next BCCH modification period to acquire barring parameters for the access categories.

Else, the UE may consider access attempts of the access categories included in the second SIB as allowed at the serving cell in the current or the next BCCH modification period. Or, the UE may consider access attempts of the access categories not included in the first SIB as allowed at the serving cell in the current or the next BCCH modification period.

(2) Option 2: The first SIB may indicate which access categories the second SIB indicates barring parameters for or which PLMNs the second SIB indicates barring parameters for.

If the UE receives the first SIB indicating inclusion of access categories in the second SIB, the UE may receive the second SIB to acquire barring parameters for the access categories in the current or the next BCCH modification period.

Else, the UE may consider access attempts of the access categories as allowed at the serving cell in the current or the next BCCH modification period, without acquiring the second SIB.

(3) Option 3: The first SIB may only provide barring parameters for zero, one or more access category from 0 to N, if provided, and the second SIB my only provide barring parameters for zero, one or more access category from N to 63, if provided. N may be indicated by the network e.g. via MIB or SIB1. Or, the first SIB may only provide barring parameters for zero, one or more PLMNs, and the second SIB may only provide barring parameters for zero, one or more other PLMNs.

For example, the first SIB may only provide barring parameters for the standardized/fixed access category from 0 to 7 (or 31), if provided, and the second SIB may only provide barring parameters for the operator-defined access category from 8 (or 32) to 63, if provided. If N is known to the UE or if N is configured via MIB or SIB1, and if the UE supports access categories between N+1 and 63, the UE may acquire the second SIB to acquire barring parameters for the access categories. If the second SIB is not scheduled via MIB or SIB1 or not indicated on PDCCH or paging, the UE may consider access attempts of the access categories between N+1 and 63 as allowed at the serving cell, without acquiring the second SIB. If N is known to the UE or if N is configured via MIB or SIB1, and if the UE does not support access categories between N+1 and 63, the UE may not acquire the second SIB for access control.

Paging message, MIB, PDCCH addressed to system information radio network temporary identifier (SI-RNTI) or PDCCH addressed to paging RNTI (P-RNTI) may indicate enabling, updating or disabling of the first SIB and/or the second SIB. Or, paging message, MIB, PDCCH addressed to SI-RNTI or PDCCH addressed to P-RNTI may indicate enabling, updating or disabling of the first SIB, and the first SIB may indicate enabling, updating or disabling of the second SIB.

One example of the invention 1 is explained as follows.

(1) Step 1: The UE receives the list of access categories of which barring information is included in SIB2. The list may be provided by system information (e.g. MIB, SIB1) or UE dedicated signaling (e.g. RRC or NAS message).

(2) Step 2: The UE receives SIB1, MIB or PDCCH enabling access barring for an access category included in the list.

(3) Step 3: If UE NAS requests access barring check with the access category and if access barring for the access category is enabled, UE RRC acquires SIB2.

(4) Step 4: If barring information is included in SIB2 for the access category, the UE performs access barring check for the access category based on the barring information. If barring information is not included in SIB2 for the access category, the UE considers access attempt of the access category as allowed.

Alternatively, if UE NAS requests access barring check with the access category and if access barring for the access category is enabled or updated, the UE in RRC_CONNECTED may consider access attempt of the access category as barred. Then, UE RRC may inform UE NAS that access barring for the access category is applicable.

If UE NAS requests access barring check with the access category and if access barring for the access category is disabled, the UE in RRC_CONNECTED may consider access attempt of the access category as allowed. Then, UE RRC may inform UE NAS that access barring for the access category is alleviated or access attempt is allowed.

Alternatively, if UE NAS requests access barring check with the access category and if access barring for the access category is enabled or updated, the UE in RRC_CONNECTED may start a timer. If the UE does not receive barring information on the access category from the network until the timer expires or stops, the UE may consider access attempt of the access category as allowed. UE RRC may inform UE NAS that access barring for the access category is alleviated or access attempt is allowed. If the UE receives barring information on the access category from the network until the timer expires or stops, the UE may perform access barring check for the access category based on the barring information. Then, UE RRC may inform UE NAS that access barring for the access category is applicable or alleviated depending on the result of the access barring check.

If UE NAS requests access barring check with the access category and if access barring for the access category is disabled, the UE in RRC_CONNECTED may stop the timer. Then, the UE consider access attempt of the access category as allowed. Then, UE RRC may inform UE NAS that access barring for the access category is alleviated or access attempt is allowed.

2. Invention 2: Grouping Access Categories for a Single Barring Information.

As a first embodiment of the invention 2, the method for the UE performing access to the network with an access category may be as follows.

(1) Step 1: The UE acquires configuration of grouping zero, one or more access categories into a single category group.

The configuration may be provided as a bitmap of which each bit indicates whether or not an access category belongs to the category group. The configuration may be acquired via an RRC message (such as UE dedicated signaling or system information) or NAS message.

(2) Step 2: If an access category is not included in the configuration, and if barring information only applicable to the access category is not provided in a RRC message such as system information, the UE may consider an access attempt of the access category as allowed.

As a second embodiment of the invention 2, the method for the UE performing access to the network with an access category may be as follows.

(1) Step 1: The UE acquires configuration of grouping zero, one or more access categories into a single category group.

The configuration may be provided as a bitmap of which each bit indicates whether or not an access category belongs to the category group. The configuration may be acquired via an RRC message (such as UE dedicated signaling or system information) or NAS message.

(2) Step 2: if the UE receives the first barring information of a category group which an access category belongs to and the second barring information only applicable to the access category, the UE performs access barring check only with the second barring information for an access attempt of the access category.

The first barring information and the second barring information may be provided on different SIBs. For example, the second barring information may be provided in SIB1, and the first barring information may be provided in SIB2.

Table 4 shows an example of SIB according to the present invention. In SIB1 or SIBx (x>1), one barring information (e.g. uac-BarringInfo) may be mapped to multiple access categories. For example, bitmap may be provided for each barring information. Each bit of the bitmap may correspond to each access category.

TABLE 4

```
BarringPerCat ::= SEQUENCE {
    AccessCategory        BIT STRING (SIZE(63))
    -- Each bit of the Bitmap corresponds to each access category.
    -- The first bit = Category 1, The second bit = Category 2...
    -- Value 0 for a bit of the Bitmap indicates 'access is allowed'
    -- Value 1 for a bit of the Bitmap indicates 'barring is applicable'
    uac-BarringInfo       SEQUENCE {
    uac-BarringFactor           ENUMERATED {
    p00, p05, p10, p15, p20, p25, p30, p40,
    p50, p60, p70, p75, p80, p85, p90, p95},
    -- FFS: parameter values
    uac-BarringTime             ENUMERATED {s4, s8, s16, s32, s64, s128, s256, s512}
    -- FFS: parameter values
    uac-BarringForAccessIdentityList        BIT STRING (SIZE(7))
```

The network may inform the UE which access categories are listed in the bitmap via dedicated signaling (e.g. RRC message or NAS message) or system information for a PLMN. The UE may consider the access categories as default set of the access categories.

If an access category is not listed in the bitmap for the PLMN, the UE may consider that separate barring information is provided for the access category. If access attempt of the access category is barring applicable, the network should provide separate barring information for the access category e.g. as follows in Table 5.

TABLE 5

```
BarringPerCat ::= SEQUENCE {
    AccessCategory            INTEGER (1..maxAccessCat),
    -- This IE corresponds to a single access category
    uac-BarringInfo           SEQUENCE {
    uac-BarringFactor             ENUMERATED {
    p00, p05, p10, p15, p20, p25, p30, p40,
    p50, p60, p70, p75, p80, p85, p90, p95},
    -- FFS: parameter values
    uac-BarringTime               ENUMERATED {s4, s8, s16, s32, s64, s128, s256, s512}
    -- FFS: parameter values
    uac-BarringForAccessIdentityList          BIT STRING (SIZE(7))
```

Alternatively, the default set of access categories may be indicated as a single bit or a single access category which may be one of the access categories belonging to the default set, as follows in Table 6.

TABLE 6

```
BarringPerCat ::= SEQUENCE {
    AccessCategory    INTEGER (1..maxAccessCat),
    -- If AccessCategory = 64, uac-BarringInfo below may be applied to all access
categories belonging to the default set
    uac-BarringInfo    SEQUENCE {
    uac-BarringFactor    ENUMERATED {
    p00, p05, p10, p15, p20, p25, p30, p40,
    p50, p60, p70, p75, p80, p85, p90, p95},
```

TABLE 6-continued

```
-- FFS: parameter values
uac-BarringTime          ENUMERATED {s4, s8, s16, s32, s64, s128, s256, s512}
-- FFS: parameter values
uac-BarringForAccessIdentityList      BIT STRING (SIZE(7))
```

Alternatively, one or more groups of access categories may be configured by the network. The network may inform the UE which access categories are grouped into one access category group. Each access category group may be identified by access category group ID. One barring information can be mapped to the access categories sharing the same access category group ID.

For example, when the UE performs RRC connection establishment or RRC connection resume or UL information transfer, the UE may perform the following behavior:

1> If an access category is indicated by the upper layers or selected by the RRC layer, UE shall:

2> the access category is included in BarringPerCat:

3> performs access barring check for the access category, using [T30x] as "Tbarring" and uac-BarringInfo in the BarringPerCat as "UAC barring parameter";

2> else if the access category is included in BarringPerCatGroup:

3> performs access barring check for the access category, using [T30x] as "Tbarring" and uac-BarringInfo in the BarringPerCatGroup as "UAC barring parameter";

2> else:

3> considers the access attempt for the access category as allowed.

Table 7 shows an example of SIB according to the present invention.

3. Invention 3: On-Demand SI Delivery for Access Category

As an embodiment of the invention 3, the method for the UE performing access to the network may be as follows.

(1) Step 1: The UE acquires an indicator enabling, updating or disabling access control for one or more access categories of which barring information is included in a SIB (or a SI message).

The UE may receive the indicator via paging message, MIB, SIB1, PDCCH addressed to SI-RNTI or PDCCH addressed to P-RNTI. The indicator may be mapped to one or more access categories. The indicator may be mapped to one or more RRC states such as RRC_IDLE, RRC_INACTIVE, or RRC_CONNECTED. The indicator may be received together with a list of access categories mapped to the indicator.

The network may indicate enabling the SIB in one of the following cases:

when no barring information was previously included in the SIB (for any access category) and barring information is initially added to the SIB; or when no barring information for a particular access category was included in the SIB and barring information for the access category is initially added to the SIB.

TABLE 7

```
BarringPerCat ::= SEQUENCE {
-- For a single access category
      AccessCategory    INTEGER (1..maxAccessCat),
      uac-BarringInfo   SEQUENCE {
      uac-BarringFactor        ENUMERATED {
      p00, p05, p10, p15, p20, p25, p30, p40,
      p50, p60, p70, p75, p80, p85, p90, p95},
      -- FFS: parameter values
      uac-BarringTime          ENUMERATED {s4, s8, s16, s32, s64, s128, s256, s512}
      -- FFS: parameter values
      uac-BarringForAccessIdentityList       BIT STRING (SIZE(7))
BarringPerCatGroup ::= SEQUENCE {
-- For a single Access Category Group mapped to one or more Access Categories
Alt1:    AccessCategoryGroup               INTEGER (1..maxAccessCatGroup),
Alt2:    AccessCategoryGroup               BIT STRING (SIZE(63))
-- Each bit of the Bitmap corresponds to each access category.
-- The first bit = Category 1, The second bit = Category 2...
-- Value 0 for a bit of the Bitmap indicates the corresponding access category does not belong
to the category group
-- Value 1 for a bit of the Bitmap indicates the corresponding access category belongs to the
category group
      uac-BarringInfo   SEQUENCE {
      uac-BarringFactor        ENUMERATED {
      p00, p05, p10, p15, p20, p25, p30, p40,
      p50, p60, p70, p75, p80, p85, p90, p95},
      -- FFS: parameter values
      uac-BarringTime          ENUMERATED {s4, s8, s16, s32, s64, s128, s256, s512}
      -- FFS: parameter values
      uac-BarringForAccessIdentityList       BIT STRING (SIZE(7))
```

The IE BarringPerCat and the IE BarringPerCatGroup may be provided in different SIBs. For example, the IE BarringPerCat may be provided in SIB2, and the IE BarringPerCatGroup may be provided in SIB1. Or, the IE BarringPerCat may be provided in SIB1, and the IE BarringPerCatGroup may be provided in SIB2.

The network may indicate updating the SIB in one of the following cases:

when barring information for a particular access category was previously included in the SIB and barring information for the access category is changed in the SIB; or when barring information for a particular access category was previously included in the first SIB and barring information for the access category is moved to the second SIB, or vice versa.

The network may indicate disabling the SIB in one of the following cases:

when barring information was previously included in the SIB (for any access category) and no barring information is included in the SIB (for any access category) e.g. when the SIB is not broadcast anymore; or when barring information for a particular access category was previously included in the SIB and barring information for the access category is removed from the SIB.

(2) Step 2: If the UE is configured for an access category and if the UE triggers access attempt for the access category, the UE requests delivery of the SIB (or the SI message) carrying barring information of the access category based on the indicator.

In this step, the UE may trigger UL transmission indicating the SIB, e.g. by transmitting a RACH preamble. The RACH preamble can be mapped to one or more access categories or the unified access control.

(3) Step 3: The UE starts a timer and then, while the timer is running, the UE monitors time duration where the SIB (or the SI message) may be transmitted after requesting delivery of the SIB (or the SI message).

(4) Step 4: If the UE cannot acquire the SIB (or the SI message) until the timer expires or stops, or if the SIB is not scheduled or not transmitted until the timer expires or stops, the UE considers the access attempt of the access category as allowed.

One example of the invention 3 is explained as follows.

(1) Step 1: The UE receives the list of access categories of which barring information is included in SIB2. The list may be provided by system information (e.g. MIB, SIB1) or UE dedicated signaling (e.g. RRC or NAS message).

(2) Step 2: The UE receives SIB1, MIB or PDCCH enabling access barring for an access category included in the list.

(3) Step 3: If UE NAS requests access barring check with the access category and if access barring for the access category is enabled, UE RRC initiates SI request procedure in which the UE performs RACH procedure with a RACH preamble. The RACH preamble may be mapped to access control or the access category.

Alternatively, if UE NAS requests access barring check with the access category and if access barring for the access category is enabled, the UE may indicate to the network about the access category. Then, the UE receives barring information on the access category from the network e.g. via system information or dedicated signaling. The UE may be in RRC_CONNECTED. The UE may indicate to the network about the access category via MAC control element (CE), RRC message or NAS message. The barring information may indicate whether access attempt of the access category is allowed or barred. The barring information may include barring parameters. UE performs access barring check with the barring parameters.

(4) Step 4: The UE starts a timer and then, while the timer is running, the UE monitors time duration where the SIB (or the SI message) may be transmitted after requesting delivery of the SIB (or the SI message).

(5) Step 5: If the UE cannot acquire the SIB (or the SI message) until the timer expires or stops, or if the SIB is not scheduled or not transmitted until the timer expires or stops, the UE considers the access attempt of the access category as allowed.

(6) Step 6: If SIB2 is received in the time duration and if barring information is included in SIB2 for the access category, the UE performs access barring check for the access category based on the barring information. If barring information is not included in SIB2 for the access category, UE considers access attempt of the access category as allowed.

FIG. 6 shows a UE to implement an embodiment of the present invention. The present invention described above for UE side may be applied to this embodiment.

A UE 600 includes a processor 610, a memory 620 and a transceiver 630. The processor 610 may be configured to implement proposed functions, procedures and/or methods described in this description. Layers of the radio interface protocol may be implemented in the processor 610.

Specifically, the processor 610 is configured to control the transceiver 630 to receive a configuration of one or more access categories from a network. The processor 610 is configured to control the transceiver 630 to acquire a first SIB including barring information for a first set of access categories from the network. The first SIB may indicate which access category belongs to the first set of access categories. Alternatively, the first SIB may indicate which access category belongs to the second set of access categories.

When the network does not indicate existence or scheduling of a second SIB, the processor 610 is configured to allow an access attempt of an access category belonging to a second set of access categories. The processor 610 is configured to control the transceiver 630 to start UL transmission for the access category to the network. The second SIB may include barring information for the second set of access categories.

When the network indicates existence or scheduling of the second SIB, the processor 610 may be configured to control the transceiver 630 to acquire the second SIB from the network. The processor 610 may be configured to perform access barring check for the access attempt of the access category belong to the second set of access categories based on the second SIB.

The barring information included in the first SIB may be common to all PLMNs. Or, the barring information included in the first SIB may be a specific to a particular PLMN.

The processor 610 may be configured to control the transceiver 630 to receive an indicator indicating enabling, updating or disabling of the first SIB. The first SIB may indicate enabling, updating or disabling of the second SIB.

The processor 610 may be configured to control the transceiver 630 to receive an indicator indicating enabling, updating or disabling of access control for the first set of access categories. The processor 610 may be configured to control the transceiver 630 to request delivery of a SIB carrying barring information of the access category based on the indicator.

The memory 620 is operatively coupled with the processor 610 and stores a variety of information to operate the processor 610. The transceiver 630 is operatively coupled with the processor 610, and transmits and/or receives a radio signal.

The processor 610 may include application-specific integrated circuit (ASIC), other chipset, logic circuit and/or data processing device. The memory 620 may include read-only memory (ROM), random access memory (RAM), flash memory, memory card, storage medium and/or other storage device. The transceiver 630 may include baseband circuitry to process radio frequency signals. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

According to embodiment of the present invention shown in FIG. 6, access barring parameters for multiple access categories and/or multiple PLMNs can be signaled efficiently.

FIG. 7 shows more detailed UE to implement an embodiment of the present invention. The present invention described above for UE side may be applied to this embodiment.

A UE includes a processor 710, a power management module 711, a battery 712, a display 713, a keypad 714, a subscriber identification module (SIM) card 715, a memory 720, a transceiver 730, one or more antennas 731, a speaker 740, and a microphone 741.

The processor 710 may be configured to implement proposed functions, procedures and/or methods described in this description. Layers of the radio interface protocol may be implemented in the processor 710. The processor 710 may include ASIC, other chipset, logic circuit and/or data processing device. The processor 710 may be an application processor (AP). The processor 710 may include at least one of a digital signal processor (DSP), a central processing unit (CPU), a graphics processing unit (GPU), a modem (modulator and demodulator). An example of the processor 710 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 710 is configured to control the UE to receive a configuration of one or more access categories from a network. The processor 710 is configured to control the UE to acquire a first SIB including barring information for a first set of access categories from the network. The first SIB may indicate which access category belongs to the first set of access categories. Alternatively, the first SIB may indicate which access category belongs to the second set of access categories.

When the network does not indicate existence or scheduling of a second SIB, the processor 710 is configured to allow an access attempt of an access category belonging to a second set of access categories. The processor 710 is configured to control the UE to start UL transmission for the access category to the network. The second SIB may include barring information for the second set of access categories.

When the network indicates existence or scheduling of the second SIB, the processor 710 may be configured to control the UE to acquire the second SIB from the network. The processor 710 may be configured to perform access barring check for the access attempt of the access category belong to the second set of access categories based on the second SIB.

The barring information included in the first SIB may be common to all PLMNs. Or, the barring information included in the first SIB may be a specific to a particular PLMN.

The processor 710 may be configured to control the UE to receive an indicator indicating enabling, updating or disabling of the first SIB. The first SIB may indicate enabling, updating or disabling of the second SIB.

The processor 710 may be configured to control the UE to receive an indicator indicating enabling, updating or disabling of access control for the first set of access categories. The processor 710 may be configured to control the UE to request delivery of a SIB carrying barring information of the access category based on the indicator.

The power management module 711 manages power for the processor 710 and/or the transceiver 730. The battery 712 supplies power to the power management module 711. The display 713 outputs results processed by the processor 710. The keypad 714 receives inputs to be used by the processor 710. The keypad 714 may be shown on the display 713. The SIM card 715 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 720 is operatively coupled with the processor 710 and stores a variety of information to operate the processor 710. The memory 720 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 720 and executed by the processor 710. The memory 720 can be implemented within the processor 710 or external to the processor 710 in which case those can be communicatively coupled to the processor 710 via various means as is known in the art.

The transceiver 730 is operatively coupled with the processor 710, and transmits and/or receives a radio signal. The transceiver 730 includes a transmitter and a receiver. The transceiver 730 may include baseband circuitry to process radio frequency signals. The transceiver 730 controls the one or more antennas 731 to transmit and/or receive a radio signal.

The speaker 740 outputs sound-related results processed by the processor 710. The microphone 741 receives sound-related inputs to be used by the processor 710.

According to embodiment of the present invention shown in FIG. 7, access barring parameters for multiple access categories and/or multiple PLMNs can be signaled efficiently.

FIG. 8 shows a network node to implement an embodiment of the present invention. The present invention described above for network side may be applied to this embodiment. The network node may be one of eNB/gNB/ng-eNB/en-gNB/external server.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

The processor 810 may include ASIC, other chipset, logic circuit and/or data processing device. The memory 820 may include ROM, RAM, flash memory, memory card, storage medium and/or other storage device. The transceiver 830 may include baseband circuitry to process radio frequency signals. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) in a wireless communication system, the method comprising:
   receiving, from a network, a configuration of a plurality of access categories comprising one or more first access categories, and one or more second access categories different from the one or more first access categories;
   acquiring, from the network, a first system information block (SIB) including barring information for the one or more first access categories;
   based on the first SIB, determining that barring information for the one or more second access categories is included in a second SIB;
   attempting to acquire the second SIB;
   based on failing to acquire the second SIB, assuming that an access attempt of the one or more second access categories is allowed despite an inability to acquire the barring information for the one or more second access categories that is included in the second SIB; and
   performing an uplink (UL) transmission for the one or more second access categories to the network based on the determination that the access attempt of the one or more second access categories is allowed,
   wherein the barring information for the one or more first access categories is used to determine whether an access attempt of the one or more first access categories is allowed or barred, and
   wherein the barring information for the one or more second access categories is used to determine whether the access attempt of the one or more second access categories is allowed or barred.

2. The method of claim 1, wherein the first SIB indicates the one or more first access categories for which barring information is included in the first SIB.

3. The method of claim 1, wherein the first SIB indicates the one or more second access categories for which barring information is included in the second SIB.

4. The method of claim 1, further comprising acquiring the second SIB from the network based on scheduling information for the second SIB received from the network.

5. The method of claim 4, further comprising performing access barring check for the access attempt of the one or more second access categories based on the barring information for the one or more second access categories.

6. The method of claim 1, wherein the barring information for the one or more first access categories is common to all public land mobile networks (PLMNs).

7. The method of claim 1, wherein the barring information for the one or more first access categories is a specific to a particular PLMN.

8. The method of claim 1, further comprising receiving an indicator indicating enabling, updating or disabling of the first SIB.

9. The method of claim 1, wherein the first SIB indicates enabling, updating or disabling of the second SIB.

10. The method of claim 1, further comprising receiving an indicator indicating enabling, updating or disabling of access control for the one or more first access categories.

11. The method of claim 10, further comprising requesting delivery of a SIB carrying the barring information for the one or more first access categories based on the indicator.

12. A user equipment (UE) in a wireless communication system, the UE comprising:
    a memory;
    a transceiver; and
    a processor, operably coupled to the memory and the transceiver, and configured to:
    control the transceiver to receive, from a network, a configuration of a plurality of access categories comprising one or more first access categories, and one or more second access categories different from the one or more first access categories;
    acquire, from the network, a first system information block (SIB) including barring information for the one or more first access categories;
    based on the first SIB, determine that barring information for the one or more second access categories is included in a second SIB;
    attempt to acquire the second SIB;
    based on failing to acquire the second SIB, assume that an access attempt of the one or more second access categories is allowed despite an inability to acquire the barring information for the one or more second access categories that is included in the second SIB; and
    control the transceiver to perform an uplink (UL) transmission for the one or more second access categories to the network based on the determination that the access attempt of the one or more second access categories is allowed,
    wherein the barring information for the one or more first access categories is used to determine whether an access attempt of the one or more first access categories is allowed or barred, and
    wherein the barring information for the one or more second access categories is used to determine whether the access attempt of the one or more second access categories is allowed or barred.

13. A processor for a wireless communication device in a wireless communication system,
    wherein the processor is configured to control the wireless communication device to:
    receive, from a network, a configuration of a plurality of access categories comprising one or more first access categories, and one or more second access categories different from the one or more first access categories;

acquire, from the network, a first system information block (SIB) including barring information for the one or more first access categories;

based on the first SIB, determine that barring information for the one or more second access categories is included in a second SIB;

attempt to acquire the second SIB;

based on failing to acquire the second SIB, assume that an access attempt of the one or more second access categories is allowed despite an inability to acquire the barring information for the one or more second access categories that is included in the second SIB; and perform an uplink (UL) transmission for the one or more second access categories to the network based on the determination that the access attempt of the one or more second access categories is allowed, wherein the barring information for the one or more first access categories is used to determine whether an access attempt of the one or more first access categories is allowed or barred, and wherein the barring information for the one or more second access categories is used to determine whether the access attempt of the one or more second access categories is allowed or barred.

14. The method of claim 1, wherein the UE is in communication with at least one of a mobile device, a network, or autonomous vehicles other than the UE.

15. The method of claim 1, further comprising:
based on successfully acquiring the second SIB, performing an access barring check for the access attempt of the one or more second access categories using the barring information for the one or more second access categories.

16. The UE of claim 12, wherein the processor is further configured to:
based on successfully acquiring the second SIB, perform an access barring check for the access attempt of the one or more second access categories using the barring information for the one or more second access categories.

17. The processor of claim 13, wherein the processor is further configured to control the wireless communication device to, based on successfully acquiring the second SIB, perform an access barring check for the access attempt of the one or more second access categories using the barring information for the one or more second access categories.

* * * * *